(12) United States Patent
Lai et al.

(10) Patent No.: US 8,854,336 B2
(45) Date of Patent: *Oct. 7, 2014

(54) LIGHT GUIDE MODULE, OPTICAL TOUCH MODULE, AND METHOD OF INCREASING A SIGNAL TO NOISE RATIO OF AN OPTICAL TOUCH MODULE

(75) Inventors: Hung-Ching Lai, Hsin-Chu (TW); Chiang-Yuan Chuang, Hsin-Chu (TW); Hui-Hsuan Chen, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 1047 days.

This patent is subject to a terminal disclaimer.

(21) Appl. No.: 12/719,021

(22) Filed: Mar. 8, 2010

(65) Prior Publication Data

US 2010/0214270 A1 Aug. 26, 2010

Related U.S. Application Data

(63) Continuation-in-part of application No. 12/512,630, filed on Jul. 30, 2009.

(60) Provisional application No. 61/235,345, filed on Aug. 19, 2009.

(30) Foreign Application Priority Data

Feb. 25, 2009 (TW) .............................. 98202836 U
Nov. 10, 2009 (TW) .............................. 98138063 A

(51) Int. Cl.
*G09G 5/00* (2006.01)
*G06F 3/042* (2006.01)

(52) U.S. Cl.
CPC .................................. *G06F 3/0428* (2013.01)

USPC ........... 345/175; 345/166; 345/173; 345/176; 345/178; 250/216; 250/201.1; 178/18.01; 178/18.03; 178/18.09; 359/201.1

(58) Field of Classification Search
USPC .......... 345/175, 173, 179, 176, 104; 250/216, 250/201.1; 178/18.01, 18.03, 18.09; 359/201.1

See application file for complete search history.

(56) References Cited

U.S. PATENT DOCUMENTS

| | | | | |
|---|---|---|---|---|
| 4,746,770 A | * | 5/1988 | McAvinney | 178/18.09 |
| 5,914,709 A | * | 6/1999 | Graham et al. | 345/179 |
| 8,384,693 B2 | * | 2/2013 | Newton | 345/175 |

(Continued)

FOREIGN PATENT DOCUMENTS

| | | |
|---|---|---|
| CN | 101194222 A | 6/2008 |
| CN | 101432647 A | 5/2009 |
| TW | 200809285 | 2/2008 |
| TW | 200825487 | 6/2008 |
| TW | M363032 | 8/2009 |
| WO | 2006081633 A1 | 8/2006 |

*Primary Examiner* — Olga Merkoulova
(74) *Attorney, Agent, or Firm* — Winston Hsu; Scott Margo

(57) ABSTRACT

A light guide module is applied in an optical touch module. A focusing component of the light guide module focuses the light emitted from a light guide component of the light guide module, so that all the light emitted from the light guide component can be convergently distributed in a touch area of the optical touch module. In this way, the light provided by a lighting component of the optical touch module can be effectively utilized, and the signal to noise ratio of the received signal of a sensor of the optical touch module increases. Therefore, the optical touch module can determines the location of the finger or the contacting object more correctly.

12 Claims, 16 Drawing Sheets

(56) References Cited

U.S. PATENT DOCUMENTS

| | | |
|---|---|---|
| 2001/0026268 A1* | 10/2001 | Ito .................................. 345/175 |
| 2006/0001653 A1 | 1/2006 | Smits |
| 2007/0285406 A1 | 12/2007 | Kukulj |
| 2008/0080811 A1 | 4/2008 | Deane |
| 2009/0058832 A1* | 3/2009 | Newton ........................ 345/175 |
| 2009/0141002 A1 | 6/2009 | Sohn |
| 2010/0214269 A1 | 8/2010 | Wang |

\* cited by examiner

LIGHT GUIDE MODULE, OPTICAL TOUCH MODULE, AND METHOD OF INCREASING A SIGNAL TO NOISE RATIO OF AN OPTICAL TOUCH MODULE

CROSS REFERENCE TO RELATED APPLICATIONS

This application is a continuation-in-part of U.S. application Ser. No. 12/512,630, filed on Jul. 30, 2009, and claims the benefit of U.S. Provisional Application No. 61/235,345, filed on Aug. 19, 2009 and the contents of which are incorporated herein.

BACKGROUND OF THE INVENTION

1. Field of the Invention

The present invention is related to a light guide module, and more particularly, to a light guide module applied in an optical touch module.

2. Description of the Prior Art

The touch screen (touch panel) can be utilized for replacing the mechanical button operation by touch operation through an object or a finger. When a user touches the pattern on the screen, the touch screen can response the touch event by displaying frames or generating sounds according to the operation programs built in the touch screen.

In general, the touch screen can be a resistive touch screen, a capacitive touch screen, an acoustic touch screen, or an optical touch screen. The resistive touch screen uses a spacer to separate two ITO (Indium Tin Oxide) conductive layers; when the user presses the resistive touch screen, the top electrode and the bottom electrode are contacted so that the location of the touch point can be calculated according to the voltage variance on the resistive touch screen. The capacitive touch screen calculates the location of the touch point according to the current induced by the capacitance variance, which is generated by the electrostatic bonding between the arranged transparent electrodes and the human body. In the acoustic touch screen, supersonic waves are transmitted through the surface of the touch panel; when the user touches the surface of the touch panel through a contacting object, the contacting object absorbs supersonic waves so that the touch location can be calculated according to the decay of the supersonic waves.

In the optical touch screen, the light is transmitted through the surface of the touch panel and a sensor generates signal by sensing the light. When the light is blocked by a contacting object at a touch location, the touch location can be obtained by determining where the sensor does not sense the light. The optical touch screen comprises a glass substrate, a lighting component, a sensor, and a lens. The lighting component and the sensor are disposed on the top right corner of the glass substrate. Two reflectors are respectively disposed on the left side and the bottom side of the glass substrate. The lighting component emits the light in various directions to the touch screen and the reflectors reflect the light back to the sensor. When a finger or a contacting object blocks the light, the touch location of the finger (or the contacting object) is obtained according to the signal generated by the sensor sensing the light through the lens.

In the conventional optical touch screen, since the touch location is obtained by the sensor sensing the light reflected by the reflector, the obtained touch location is easily affected by the ambient light. The light reflected by the reflector and the light emitted by the lighting component cause an interaction to the sensor. In addition, since the lighting component disposed on the top right corner of the glass substrate has to illuminate the distant reflectors, the lighting component has to be disposed accurately and the lighting component has to have a higher output brightness and a larger output current.

SUMMARY OF THE INVENTION

The present invention is related to a light guide module. The light guide module is applied in an optical touch module. The optical touch module has a touch area, a sensor, and a lighting component. The sensor is located on a first corner of the touch area. The lighting component is utilized for providing a light. The light guide module and the lighting component are disposed on a first side of the touch area for evenly distributing the light provided by the lighting component to the touch area. The light guide module comprises a light guide component, and a focusing component. The light guide component is utilized for guiding the light to diffuse along the light guide component. The light guide component comprises a light-receiving surface, and a light-emitting surface. The light-receiving surface faces the lighting component for receiving the light. The light-emitting surface faces the touch area. The focusing component is utilized for focusing the light emitted from the light-emitting surface so as to urge the light evenly distributed in the touch area.

The present invention further provides an optical touch module. The optical touch module comprises a touch area, a sensor, a lighting component, and a light guide module. The sensor is located at a first corner of the touch area.

The lighting component is disposed on a first side of the touch area for providing a light. The light guide module is disposed on the first side of the touch area for evenly distributing the light provided by the lighting component to the touch area. The light guide module comprises a light guide component, and a focusing component. The light guide component is utilized for guiding the light to diffuse along the light guide component. The light guide component comprises a light-receiving surface, and a light-emitting surface. The light-receiving surface faces the lighting component for receiving the light. The light-emitting surface faces the touch area. The focusing component is utilized for focusing the light emitted from the light-emitting surface so as to urge the light evenly distributed in the touch area.

The present invention further provides a method of increasing a signal-to-noise ratio of an optical touch module. The optical touch module has a touch area, a sensor, a lighting component, and a light guide component. The sensor located at a first corner of the touch area. The lighting component is utilized for providing a light. The light guide component is utilized for guiding the light to diffuse along the light guide component. The light guide component comprises a light-receiving surface and a light-emitting surface. The light-receiving surface faces the lighting component for receiving the light. The light-emitting surface faces the touch area. The method comprises disposing a focusing component in front of the light-emitting surface of the light guide component, and the focusing component focusing the light emitted from the light-emitting surface so as to urge the light convergently distributed in the touch area, increasing the signal-to-noise ratio of the optical touch module.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
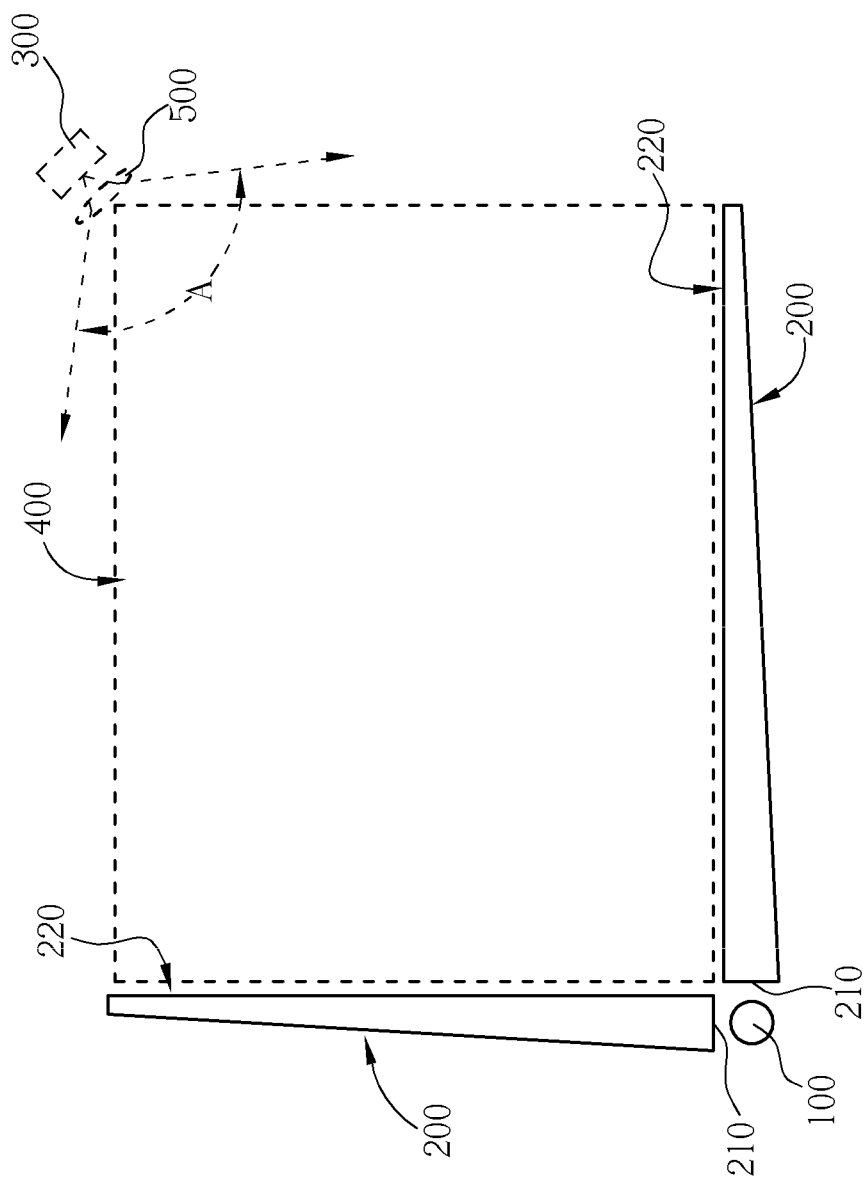
FIG. 1 is a top view of an optical touch module according to a first embodiment of the present invention.

Please refer to FIG. 1. FIG. 1 is a top view of an optical touch module according to a first embodiment of the present invention. In the present embodiment, the optical touch module is disposed on a display screen, such as an LCD, a CRT, an electric whiteboard, and so on.

The optical touch module comprises a touch area 400, a sensor 300, a lighting component 100, and a light guide component 200. The sensor 300 is disposed on a corner of the touch area 400. The number of the lighting components 100 can be one or plural, depending on the design; in the present embodiment, the number is set to be one for explanation. Similarly, the number of the light guide components 200 can be one or plural, and so can the number of the sensors 300. The light guide component 200 is disposed on at least one side of the touch area 400. The touch area 400 can be a polygon (for example, a quadrangle, a pentagon, a hexagon, and so on). The light guide component 200 is disposed on one side of the touch area 400. The light guide component 200 comprises a light-receiving surface 210, and a light-emitting surface 220. The light-receiving surface 210 faces the lighting component 100. More particularly, the light-receiving surface 210 is adjacent to the lighting component 100; the light-receiving surface 210 matches the light-emitting surface of the lighting component 100; an interval may be disposed between the light-receiving surface 210 and the light-emitting surface of the lighting component 100. In addition, the light-emitting surface 220 faces the touch area 400.

The optical touch module further comprises a lens 500 corresponding to the sensor 300. The lens 500 is located between the sensor 300 and the touch area 400. The lens 500 is adjacent to the sensor 300; the lens 500 matches the light-receiving surface of the sensor 300; an interval may be disposed between the lens 500 and the light-receiving surface of the sensor 300.

The lighting component 100 can be located on the corner, opposite to the sensor 300, of the touch area 400.

In the present embodiment, the touch area 400 is illustrated with a rectangle (quadrangle) for example. The sensor 300 is disposed on a corner of the touch area 400. The lighting component 100 is disposed on a corner which is the same or different to the corner the sensor 300 disposed. In other words, the sensor 300 is disposed on a corner of the touch area 400, and the lighting component 100 is disposed on the corner corresponding to the sensor 300. The corner on which the lighting component 100 is disposed, can be adjacent or diagonal to the corner on which the sensor 300 is disposed. When the lighting component 100 is disposed on the corner diagonal to the sensor 300, two light guide components 200 are respectively disposed on the two sides of the touch area 400 adjacent to the lighting component 100 (as shown in FIG. 1). The light guide component 200 can be a wedge structure (that is, the part of the light guide component 200 near the lighting component 100 is thicker than the part of the light guide component 200 away from the lighting component 100), or a straight structure.

The touch area 400 can also be of a more complicated polygon, e.g. pentagon. In such condition, the lighting component 100 can be disposed on a corner different form the corner on which the sensor 300 is disposed.

The lighting component 100 is utilized for emitting lights. The lights emitted by the lighting component 100 can be infrared lights, or visible lights. The lighting component can be an infrared Light-Emitting Diode (LED), or a visible-light LED.

The light-receiving surface 210 is utilized for receiving the lights emitted by the lighting component 100. The shape of the light-receiving surface 210 matches the shape of the lighting component 100. In addition, the light-receiving surface 210 is a smooth surface for avoiding scattering the lights emitted by the lighting component 100 so as to urge the lights entering the light-receiving surface 210 more efficiently.

The light guide component is made of a material different from the air. That is, the refractive index of the light guide component 200 is different from that of the air. Because of the refractive index difference, the lights are limited to be transmitted within the light guide component 200 after the lights enter the light guide component 200 through the light-receiving surface 210. The light-emitting surface 220 is utilized for providing the lights to leave the light guide component 200. The light-emitting surface 220 is of a diffusion structure, which can be an optical grating structure or an irregular structure, for avoiding total reflection, and more particularly, for refracting the lights to leave the light guide component 200 when the lights transmitted in the light guide component 200 reach to the diffusion structure. Since the shape and the position of the diffusion structure are designed on the mold of the light guide component 200 previously to the fabrication, when the light guide component 200 is fabricated by injection molding or die casting, the diffusion structure is formed on the light-emitting surface 220. The diffusion structure can be formed on the light-emitting surface 220 in other ways, e.g. sandblasting, after the light guide component 200 is fabricated by injection molding or die casting. The lens 500 is utilized for increasing the viewing angle A of the sensor 300 so that the sensor 300 can receive the lights in a larger angle by means of the lens 500. For instance, in the present embodiment, the touch area 400 is a rectangle (quadrangle). The four angles of the touch area 400 are all equal to 90°. The viewing angle of a general sensor 300 is smaller than 90°. Thus, when the sensor 300 is disposed on a corner of the touch area 400, the sensor 300 only can sense the light in the angles limited by the viewing range of the sensor 300, so that the sensor 300 does not receive all of the lights in the touch area 400. In this way, when a finger or a contacting object is in the touch area 400 but out of the viewing range of the sensor 300, the sensor 300 does not obtain the touch location of the finger or the contacting object. The lens 500 is disposed between the sensor 300 and the touch area 400 so as to increase the viewing angle of the sensor 300. For instance, in the present embodiment, the sensor 300 can sense the light in an angle more than 90° through the lens 500. In this way, when the sensor 300 is disposed on a corner of the touch area 400, since the viewing angle of the sensor 300 is more than 90° by means of the lens 500, the sensor 300 can receive all of the lights in the touch area 400.

In the optical touch module of the present invention (as shown in FIG. 1), the light-receiving surfaces of the two light guide components 200 receive the lights emitted by the lighting component 100. The lights are limited to transmit within the light guide components 200 because of the refractive index difference between the light guide components 200 and the air. Finally, the lights leave from the two light guide components 200 through the diffusion structures of the light-emitting surfaces 220 and are distributed in the touch area 400. The sensor 300 receive all of the lights in the touch area 400 with the lens 500. When a finger or a contacting object touches the touch area 400, a part of the lights emitted from the light-emitting surfaces 220 to the touch area 400 is blocked by the finger or the contacting object. The sensor 300 determines the touch location of the finger or the contacting object on the touch area 400 according to the blocked light. Consequently, in the present embodiment, two light guide components 200 distribute the lights emitted by the lighting component 100 evenly in the touch area 400 for replacing the conventional method of the reflectors reflecting the lights emitted by the lighting component 100. In this way, resistance against the ambient light of the optical touch module increases, and the affection to the sensor 300 caused by lights from the reflectors and the lighting component 100 is avoided. In addition, the output intensity of the lighting component 100 can be lowered so as to reduce the current loss and the requirement of the counterpoint accuracy of the optical touch module.

Figure 2:
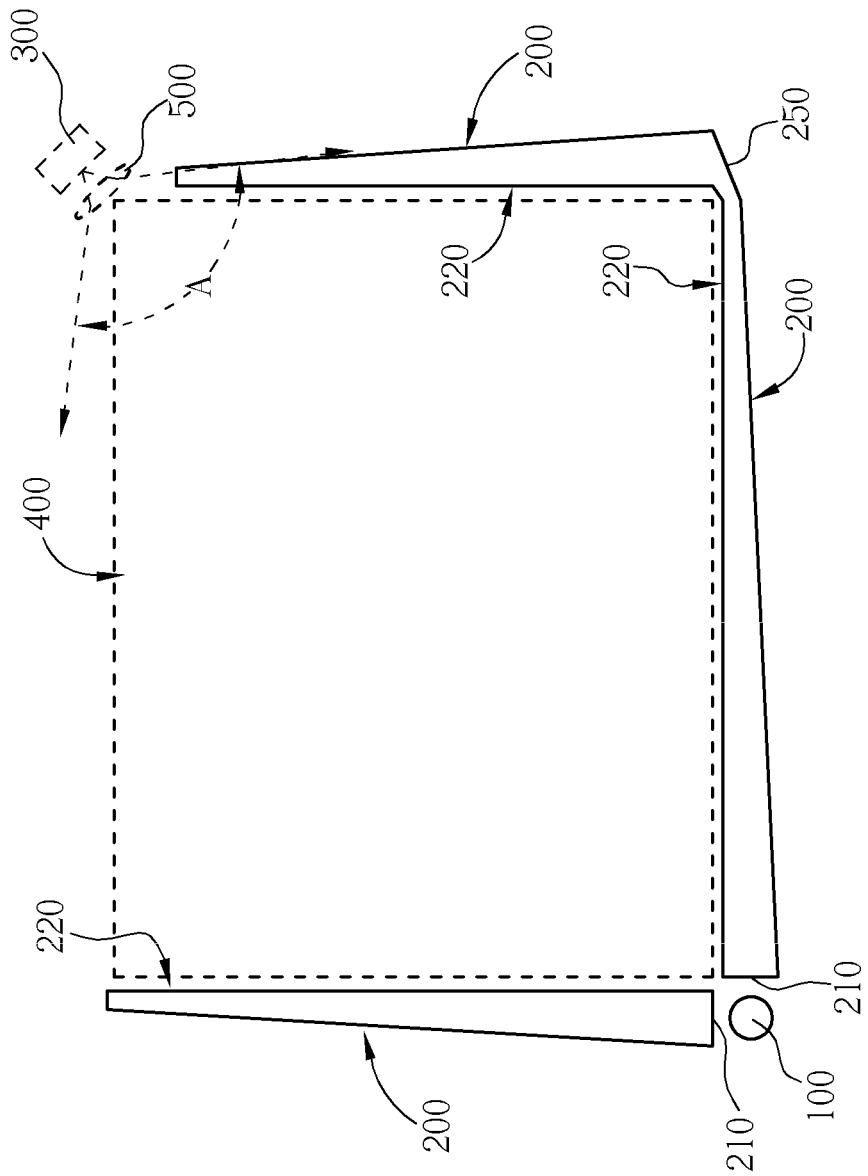
FIG. 2 is a top view of an optical touch module according to a second embodiment of the present invention.

FIG. 2 is a top view of an optical touch module according to a second embodiment of the present invention. Please refer to FIG. 2 and the above-mentioned embodiment. In the present embodiment, one of the two light guide components 200 is disposed on one side (left side) adjacent to the lighting component 100; the other one of the two light guide components 200 is disposed on the other side (bottom side) adjacent to the lighting component 100, wherein one end of the light guide component 200 away from the lighting component 100 is bended along with the shape of the corner of the touch area 400 and is extended to the corner diagonal to the lighting component 100 (the top right corner). In the bended light guide component 200, a reflecting surface 250 is fabricated at the bending location (the bottom right corner) for reflecting the lights so as to limit the lights reflected within the light guide component 200 and transmitted to the corner diagonal to the lighting component 100. In this way, the light guide components 200 transmit the lights to the three sides of the touch area 400 evenly in the touch area 400. The above-mentioned mechanism replaces the method of utilizing the reflectors to reflect the lights emitted by the lighting component 100 in the prior art. As a result, the resistance against the ambient light of the optical touch module increases, and the affection to the sensor 300 caused by the lights from the reflectors and the lighting component 100 is prevented. In addition, the output intensity of the lighting component 100 can be lowered so as to reduce the current loss and the requirement of the counterpoint accuracy of the optical touch module.

Figure 3:
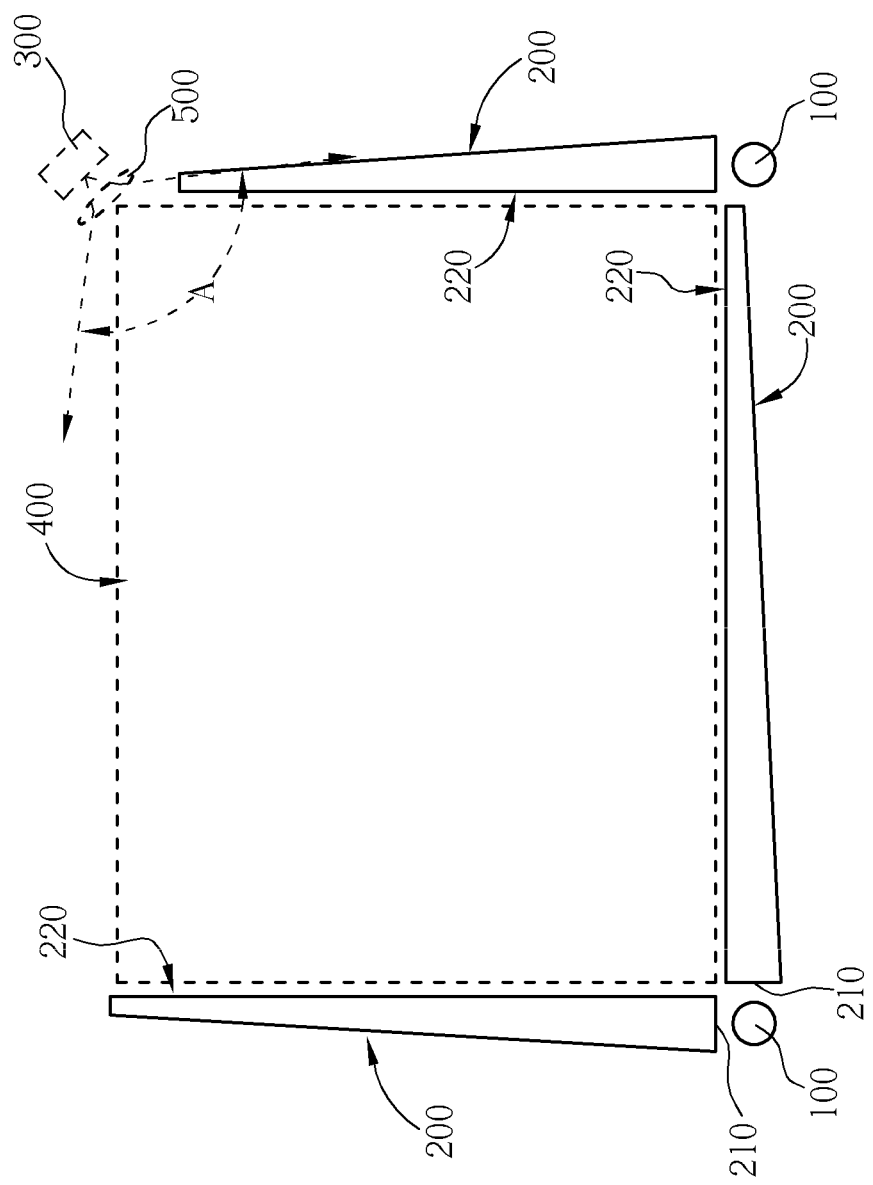
FIG. 3 is a top view of an optical touch module according to a third embodiment of the present invention.

FIG. 3 is a top view of an optical touch module according to a third embodiment of the present invention. Please refer to FIG. 3 and the above-mention embodiments. In the present embodiment, the optical touch module comprises two lighting components 100 and three light guide components 200, and the touch area 400 can be a rectangle (quadrangle). The sensor 300 is disposed on a corner (the top right corner) of the touch area 400. One of the two lighting components 100 is disposed on the corner diagonal to the sensor 300 of the touch area 300 (the bottom left corner), and the other one is disposed on the corner adjacent to the sensor 300 of the touch area 300 (the bottom right corner). Among the light guide components 200, one is disposed on the side (the bottom side) between the two lighting components 100, and the other two are respectively disposed on the two sides (the left side and the right side) adjacent to the lighting components 100. In the present embodiment, the light-receiving surfaces 210 of the two light guide components 200 respectively receive the lights emitted from the two lighting components 100. The lights are limited to be transmitted within the three light guide components 200 because of the refractive index difference between the light guide components 200 and the air. Finally, the lights leave from the three light guide components 200 through the diffusion structures of the emitting-light surfaces 220 and are distributed in the touch area 400. The sensor 300 receives all of the lights in the touch area 400 with the lens 500. When a finger or a contacting object touches the touch area 400, a part of the lights emitted from the light-emitting surfaces 220 to the touch area 400 is blocked by the finger or the contacting object. The sensor 300 determines the touch location of the finger or the contacting object on the touch area 400 according to the blocked light. Consequently, in the present embodiment, three light guide components 200 distribute the lights emitted by the two lighting components 100 evenly in the touch area 400. The above-mentioned mechanism replaces the conventional method of utilizing the reflectors to reflect the lights emitted by the lighting component 100 in the prior art. In this way, the resistance against the ambient light of the optical touch module increases, and the affection to the sensor 300 caused by lights from the reflectors and the lighting component 100 is avoided. In addition, the output intensity of the lighting component 100 can be lowered so as to reduce the current loss and the requirement of the counterpoint accuracy of the optical touch module.

Figure 4:
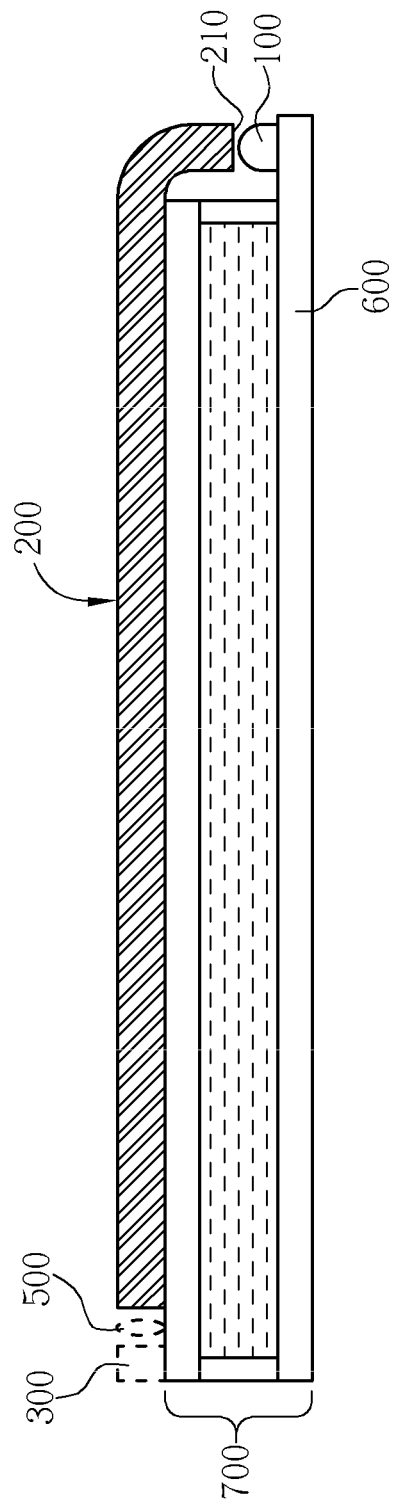
FIG. 4 is a side view of an optical touch module according to a fourth embodiment of the present invention.

FIG. 4 is a lateral view of an optical touch module according to a fourth embodiment of the present invention. Please refer to FIG. 4 and the above-mention embodiments. In the present embodiment, the optical touch module comprises a substrate 600 located below the touch area 400. The substrate 600 may be a printed-circuit board (PCB), or an Indium Tin Oxide (ITO) glass. In the present embodiment, the sensor 300, the touch area 400, and the lens 500 are disposed on the LCD panel 700, wherein the LCD panel 700 is formed by an ITO glass, a liquid crystal layer, and a color filter and so on. The lighting component 100 is disposed on the surface of the ITO glass facing the touch area 400 (the substrate 600). The light guide component 200 is adjacent to the lighting component 100 for receiving the lights emitted by the lighting component 100 through the light-receiving surface 210, and transmitting the lights to a side of the touch area 400. Since the ITO glass has circuits and transistors for controlling the liquid crystal particles in the LCD panel 700, the lighting component 100 can be formed on the ITO glass along with the fabrication of the ITO glass. By means of the light guide component 200 guiding the lights emitted by the lighting component 100, the lights can be transmitted above the LCD panel 700, and leave from the light guide component 200 for the touch area 400.

Figure 6:
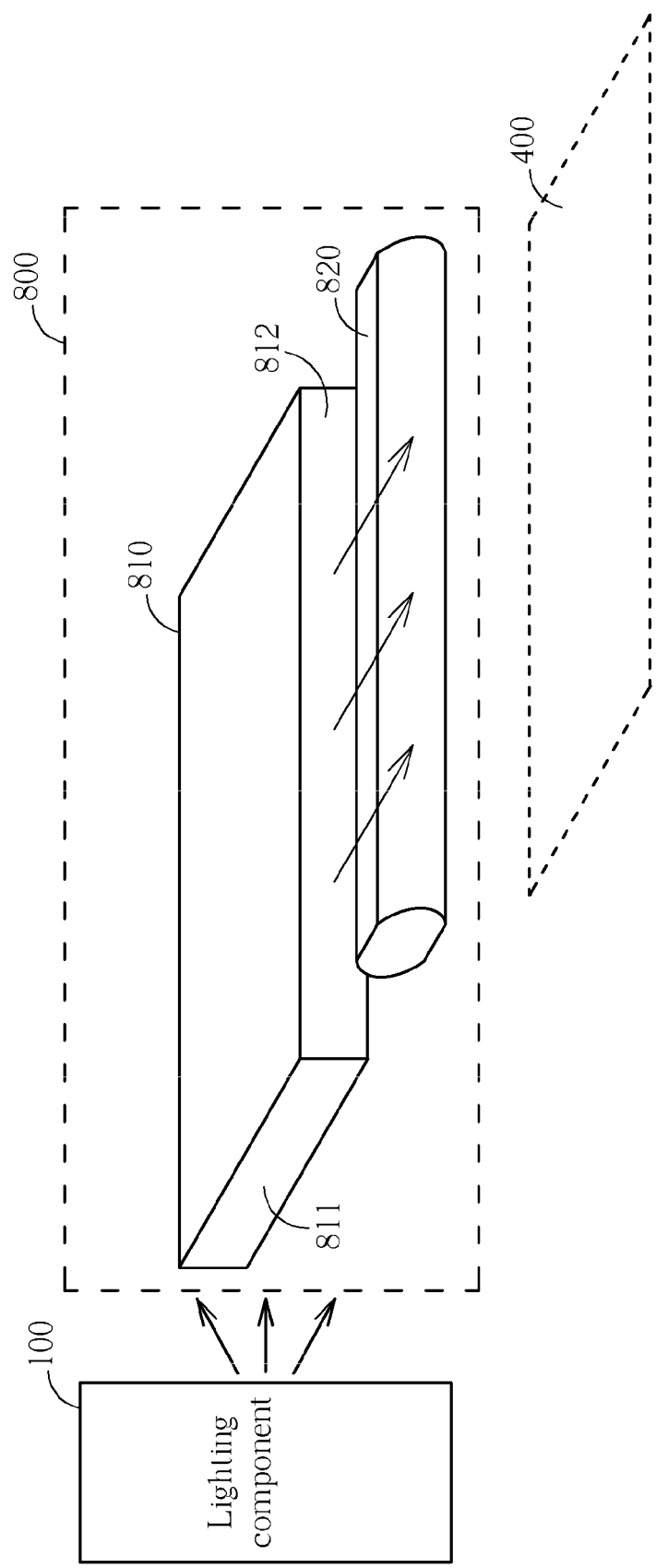
FIG. 6 is a diagram illustrating a light guide module according to a sixth embodiment of the present invention.

According to the embodiment shown in FIG. 6, the lighting component 100 is fabricated on the ITO glass of the LCD panel (the substrate 600). The lights emitted by the light component 100 are limited to be transmitted within the light guide component 200. The lights finally leave from the light guide component 200 and are distributed in the touch area 400. The sensor 400 can receive all of the lights in the touch area 400 with the lens 500. When a finger or a contacting object touches the touch area 400, a part of the lights emitted from the light-emitting surfaces 220 to the touch area 400 is blocked by the finger or the contacting object. The sensor 300 determines the touch location of the finger or the contacting object on the touch area 400 according to the blocked light. Therefore, in the present invention, the thickness of the optical touch module can be reduced, and the additional cost of fabricating the lighting component 100 on another PCB is no longer required, by disposing the lighting component 100 on the substrate 600 and utilizing the light guide component 200 to distribute evenly the lights emitted by the lighting component 100 in the touch area 400.

Figure 5:
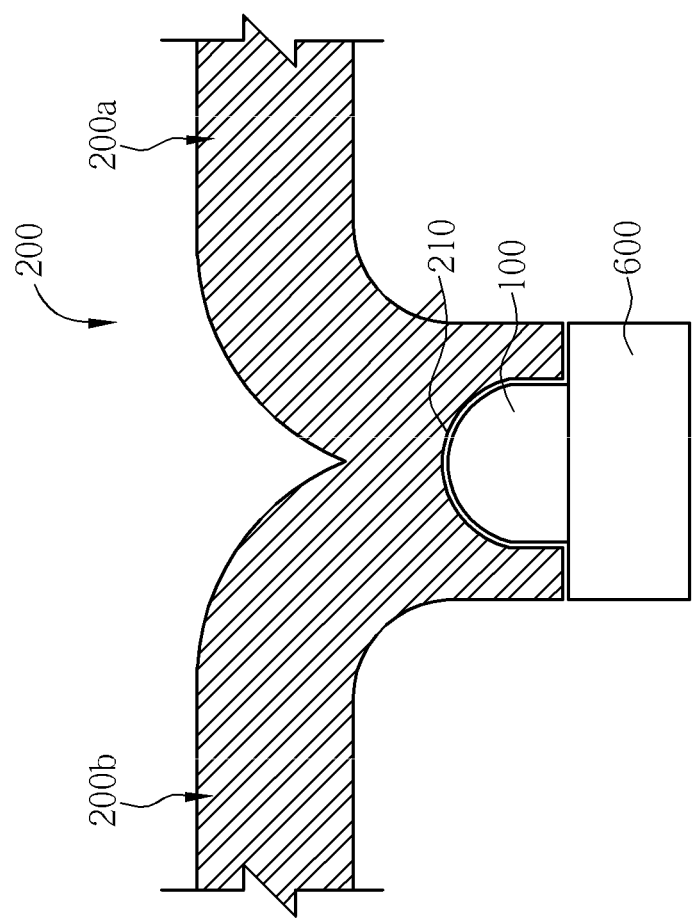
FIG. 5 is a diagram illustrating the adjoining location of the light guide component and the lighting component.

FIG. 5 is a diagram illustrating the joint of the light guide component and the lighting component. Please refer to FIG. 5 and the fourth embodiment. In the present embodiment, one end of the light guide component 200 has a containing region for containing the lighting component 100, and the other end of the light guide component 200 is divided into two sub light guide components 200a and 200b extending to the two adjacent sides of the touch area 400. The containing region of the light guide component 200 has a shape matching the lighting component 100, and the inner wall of the containing region is the light-receiving surface 210. The lights emitted by the lighting component 100 enter the light guide component 200 through the light-receiving surface 210, and are transmitted to the two adjacent sides of the touch area 400 by the two sub light guide components 200a and 200b. In this way, by disposing the lighting component 100 on the substrate 600, the light-receiving surface 210 of the light guide component 200 receiving the lights emitted from the lighting component 100, and transmitting the lights to the touch area 400 through the sub light guide components 200a and 200b, and the two adjacent sides of the touch area 400, the thickness of the optical touch module is reduced, and the cost of fabricating the lighting component 100 on a PCB is no longer required. In addition, in the optical touch module of the present invention, the lights emitted by the light component 100 can be evenly distributed to the touch area 400. Therefore, the resistance against the ambient light of the optical touch module is improved. The output intensity of the lighting component 100 can be lowered so as to reduce the current loss and the requirement of the counterpoint accuracy of the optical touch module.

Please refer to FIG. 6. FIG. 6 is a diagram illustrating a light guide module 800 according to a sixth embodiment of the present invention. The light guide module 800 can be applied in the optical touch module of the present invention. The light guide module 800 is modified based on the above-mentioned light guide component 200 so as to more efficiently use the lights provided by the lighting component 100, and to evenly distribute the lights to the touch area 400. The light guide module 800 comprises a light guide component 810, and a focusing component 820. The structure and the operation principle of the light guide component 810 are similar to those of the light guide component 200 and are omitted for brevity. The light guide component 810 is utilized for guiding the lights to diffuse along the light guide component 810. The light guide component 810 comprises a light-receiving surface 811, and a light-emitting surface 812. The light-receiving surface 811 faces the lighting component 100 for receiving lights. The light-emitting surface 812 faces the touch area 400. The focusing component 820 is utilized for focusing the lights emitted from the light-emitting surface 812 so that the lights can be convergently distributed in the touch area 400. In addition, if the lighting component 100 is an infrared LED, i.e. the lighting component 100 emits infrared lights, the focusing component 820 is a lens transparent to the infrared lights.

Figure 7:
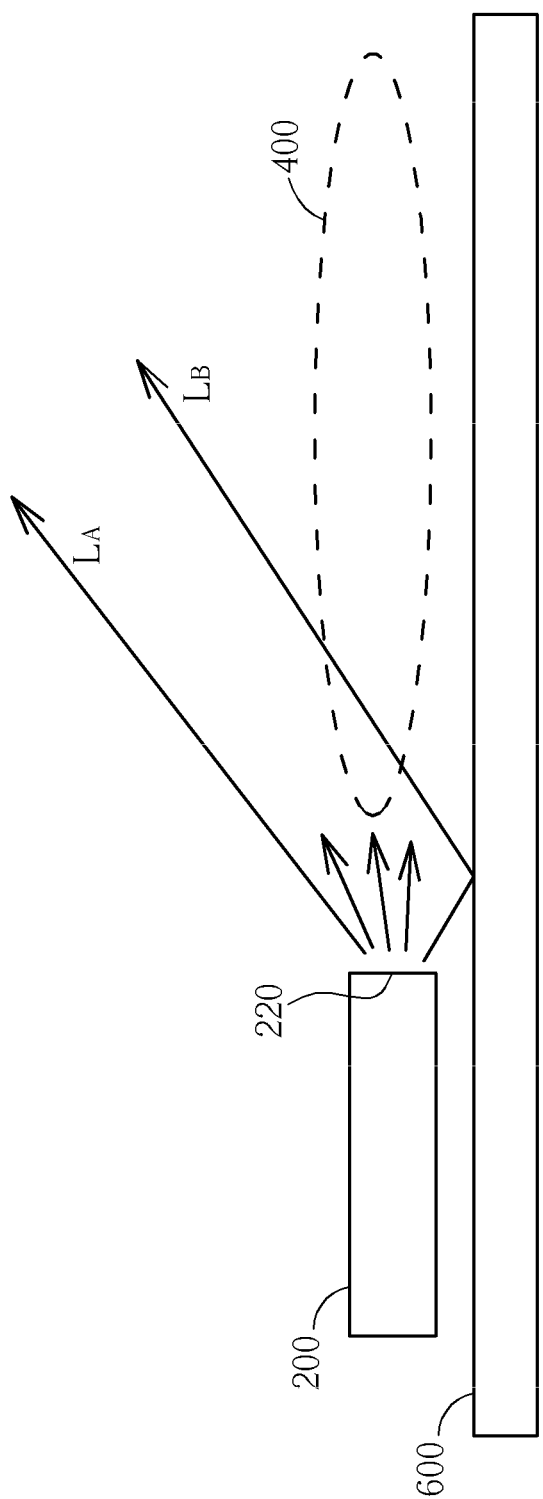
FIG. 7 is a diagram illustrating the lights directly emitted from the light guide component to the touch area.

Please refer to FIG. 7. FIG. 7 is a diagram illustrating the lights directly emitted from the light guide component 200 to the touch area 400. It can be seen in FIG. 7 that when the lights provided by the lighting component 100 are directly emitted from the light guide component 200 to the touch area 400, the intensity distribution of the emitted lights is of Lambertion distribution. That is, when the lights are emitted from the light guide component 200, the lights are evenly scattered in each direction. Since the lights emitted from the light guide component are evenly distributed in the vertical direction, a part of the lights directly leaves the touch area 400, e.g. the light $L_A$, and another part of the lights leaves the touch area 400 after being reflected by the substrate 600, e.g. the light $L_B$. Consequently, the lights provided by the lighting component 100 can not be covergently distributed in the touch area 400, so that the light energy received by the sensor 300 is reduced, which means the signal-to-noise ratio of the received signal of the sensor 300 is deteriorated, causing the difficulty of the optical touch module determining the touch location of the finger or the contacting object.

Figure 8:
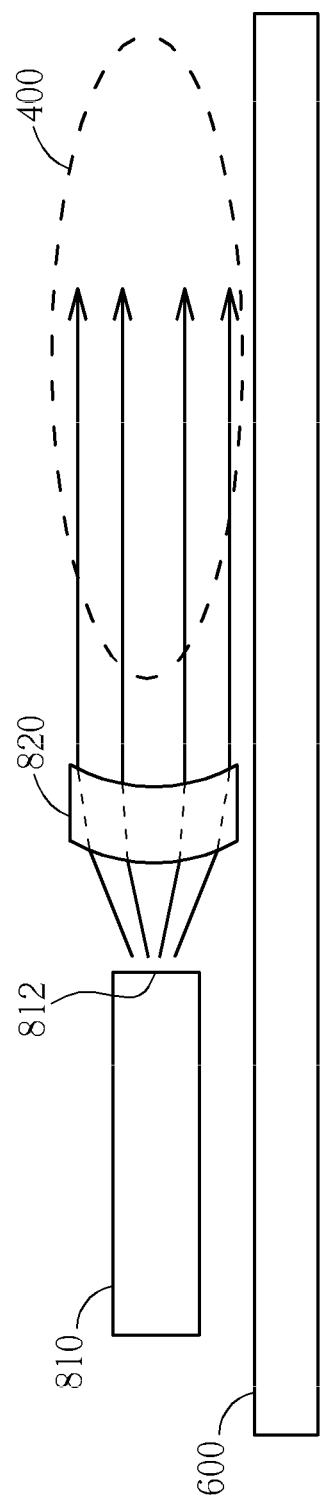
FIG. 8, FIG. 9, FIG. 10, and FIG. 11 are diagrams illustrating the operation principle of the light guide module using the lights provided by the lighting component more efficiently by means of the focusing component of different structures.
Figure 9:
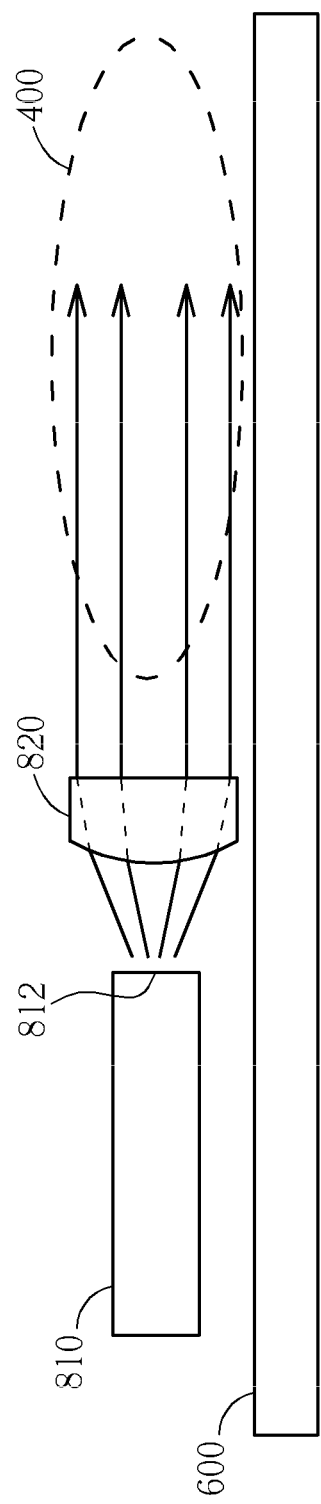
Figure 10:
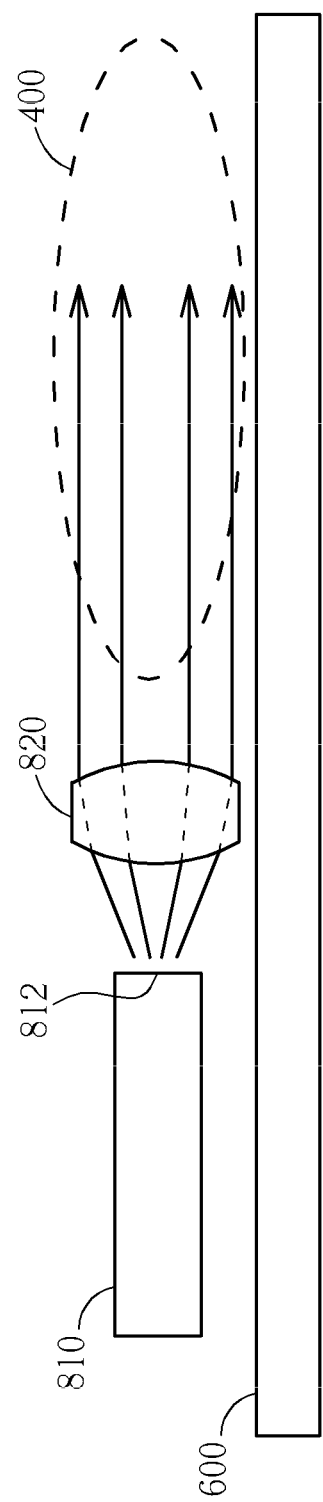
Figure 11:
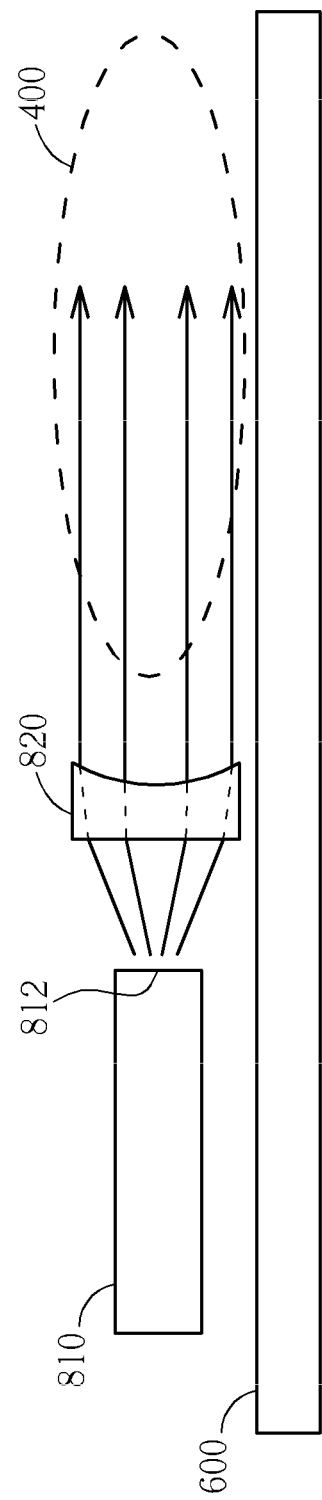

Please refer to FIGS. 8~11. FIGS. 8∞11 are diagrams illustrating the operation principle of the light guide module 800 with focusing components 820 of different structures. As shown in FIGS. 8~11, the focusing component 820 can be a convex-concave lens, a convex-flat lens, a convex-convex lens, or a flat-concave lens. When the focusing component 820 is a convex-concave lens (as shown in FIG. 8), the convex surface of the convex-concave lens faces the light-emitting surface 812, and the concave surface of the convex-concave lens faces the touch area 400. Therefore, when the lights are emitted from the light-emitting surface 812 through the focusing component 820 to the touch area 400, the lights are focused to be more convergent by the convex-concave lens. When the focusing component 820 is a convex-flat lens (as shown in FIG. 9), the convex surface of the convex-flat lens faces the light-emitting surface 812, and the flat surface of the convex-flat lens faces the touch area 400; when the focusing component 820 is a flat-concave lens (as shown in FIG. 11), the flat surface of the flat-concave lens faces the light-emitting surface 812, and the concave surface of the flat-concave lens faces the touch area 400. It can be seen from FIGS. 8~FIG. 11 that the lights emitted into the touch area 400 are approximately parallel to the substrate 600 by means of the focusing component 820 focusing the lights emitted from the light-emitting surface 812 of the light guide component 810. Hence, compared with the light guide component 200, the light guide module 800 urges the lights provided by the lighting component 100 not to directly leave the touch area 400 by means of the focusing component 820 focusing the lights emitted from the light-emitting surface 812 of the light guide component 810. In this way, the lights provided by the lighting component 100 can be convergently distributed in the touch area 400 so that the received light energy of the sensor 300 increases. That is, the signal-to-noise ratio of the received signal of the sensor 300 is improved. As a result, the optical touch module 800 determines the touch location of the finger or the contacting object more correctly.

Figure 12:
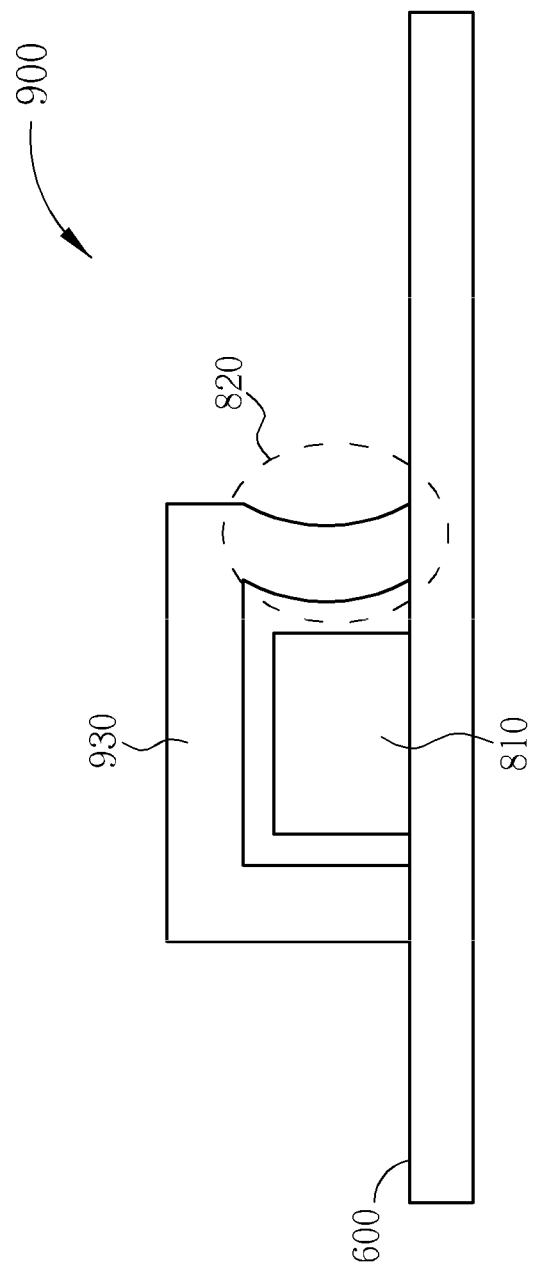
FIG. 12 is a diagram illustrating a light guide module according to a seventh embodiment of the present invention.

Please refer to FIG. 12. FIG. 12 is a diagram illustrating a light guide module 900 according to a seventh embodiment of the present invention. Compared with the light guide module 800, the light guide module 900 further comprises a holder 930 coupled to the focusing component 820. The holder 930 is utilized for covering the light guide component 810 so as to fix the light guide module 900 on the substrate 600. In addition, the focusing component 820 shown in FIG. 12 is a convex-concave lens as an example. However, the focusing component 820 shown in FIG. 12 can be a convex-flat lens, a convex-convex lens, or a flat-concave lens as well.

Figure 13:
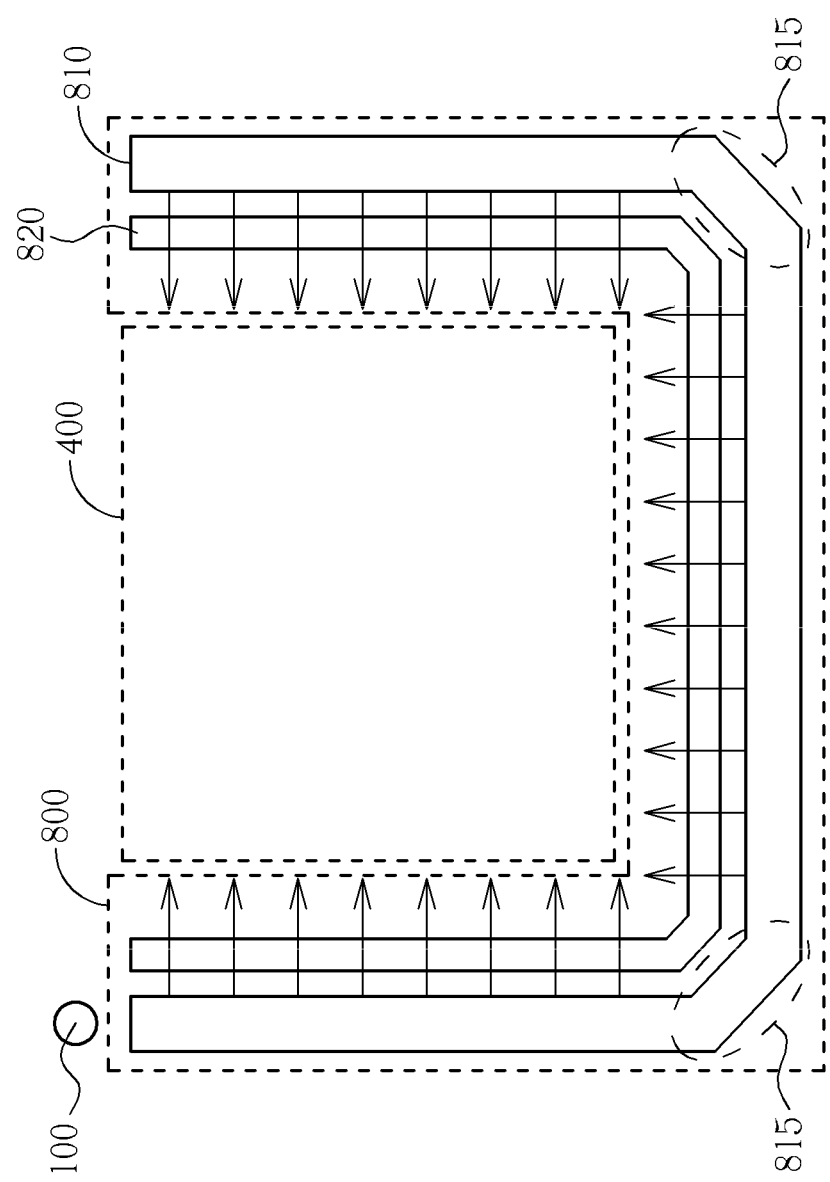
FIG. 13 is a diagram illustrating the light guide module guide the lights provided by the lighting component 100 from a plurality of sides of the touch area 400 into the touch area 400 by means of the reflecting surface.

Please refer to FIG. 13. FIG. 13 is a diagram illustrating the light guide module 800 guiding the lights provided by the lighting component 100 from a plurality of sides of the touch area 400 into the touch area 400 by means of the above-mentioned reflecting surface. In FIG. 13, the light guide component 810 of the light guide module 800 further comprises a reflecting surface 815. The structure and the operation principle of the reflecting surface 815 are similar to those of the reflecting surface 250 and are omitted for brevity. The reflecting surface 815 is located at the bending location of the light guide component 810. The reflecting surface 815 is utilized for reflecting the light so as to limit the light to reflect within the light guide component 810, and avoiding the light emitted out from the bending location of the light guide component 810. Therefore, the light guide module 800 can be disposed on a plurality of sides of the touch area 400 by means of the reflecting surface 815. For instance, in FIG. 13, the light guide module 800 is disposed on three sides of the touch area 400, which means in the optical touch module, only one lighting component (100) and one light guide module (800) are required for guiding lights from a plurality of sides of the touch area 400 into the touch area 400, and urging the lights convergently distributed in the touch area 400. In addition, the structure of the light guide component 810 is similar to the light guide component 200. The light guide component 810 can be of a wedge structure (as shown in FIGS. 1~3, the part of the light guide component 200 near the lighting component 100 is thicker than the part of the light guide component 200 away from the lighting component 100), or a straight structure (as shown in FIG. 13).

Figure 14:
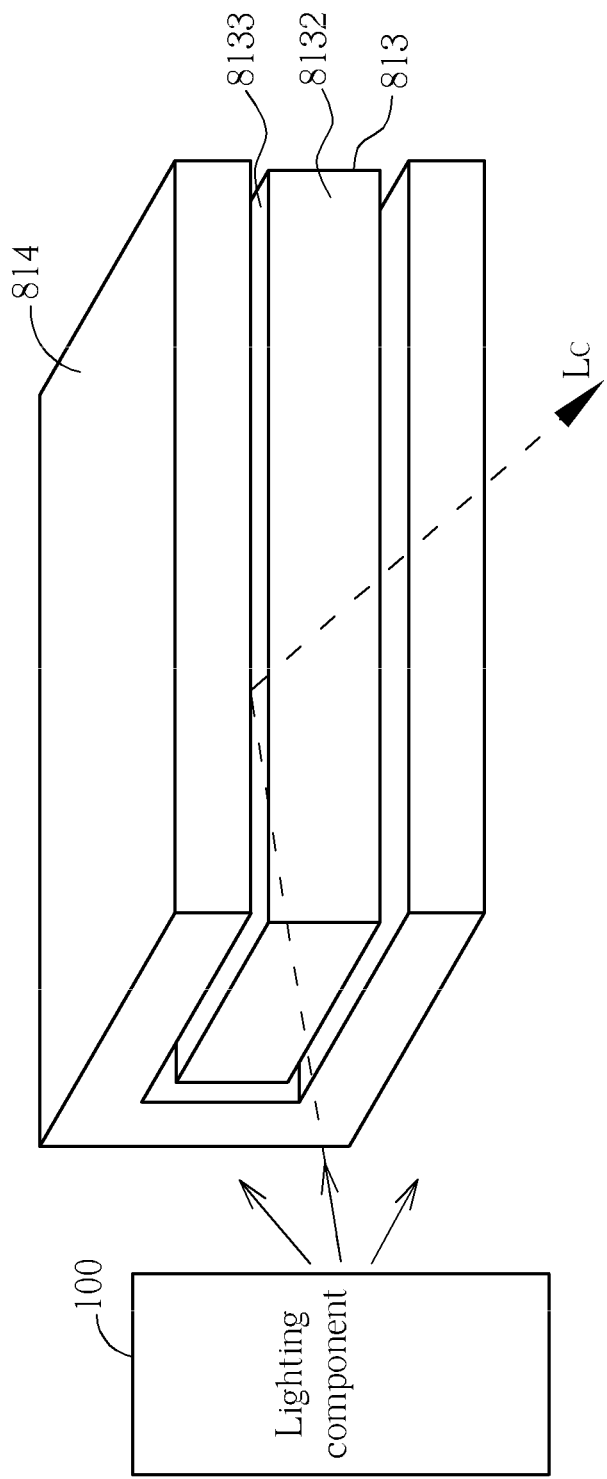
FIG. 14 is a diagram illustrating the structure of the light guide component.

Please refer to FIG. 14. FIG. 14 is a diagram illustrating the structure of the light guide component 810. The light guide component 810 further comprises a light guider 813, and a reflecting component 814. As shown in FIG. 14, the surface 8131 of the light guider 813 is utilized as the light-receiving surface 811. Consequently, the surface 8131 of the light guider 813 faces the lighting component 100. The surface 8132 of the light guider 813 is utilized as the light-emitting surface 812. The reflecting component 814 covers the light guider 813. The reflecting component 814 is utilized for reflecting the lights not emitted out of the light-emitting surface 812 (the surface 8132 of the light guider 813) back to the light guider 813 so that the light guided by the light guide component 810 only entering the touch area 400 through the light-emitting surface 812 (the surface 8132 of the light guider 813). For instance, when the light $L_C$ in FIG. 14 is emitted to the surface 8133 of the light guider 813, the light $L_C$ is reflected by the reflecting component 814 back to the light guider 813. Hence, the light $L_C$ is finally emitted from the emitting-light surface 812 (the surface 8132 of the light guider 813) to the touch area 400.

Figure 15:
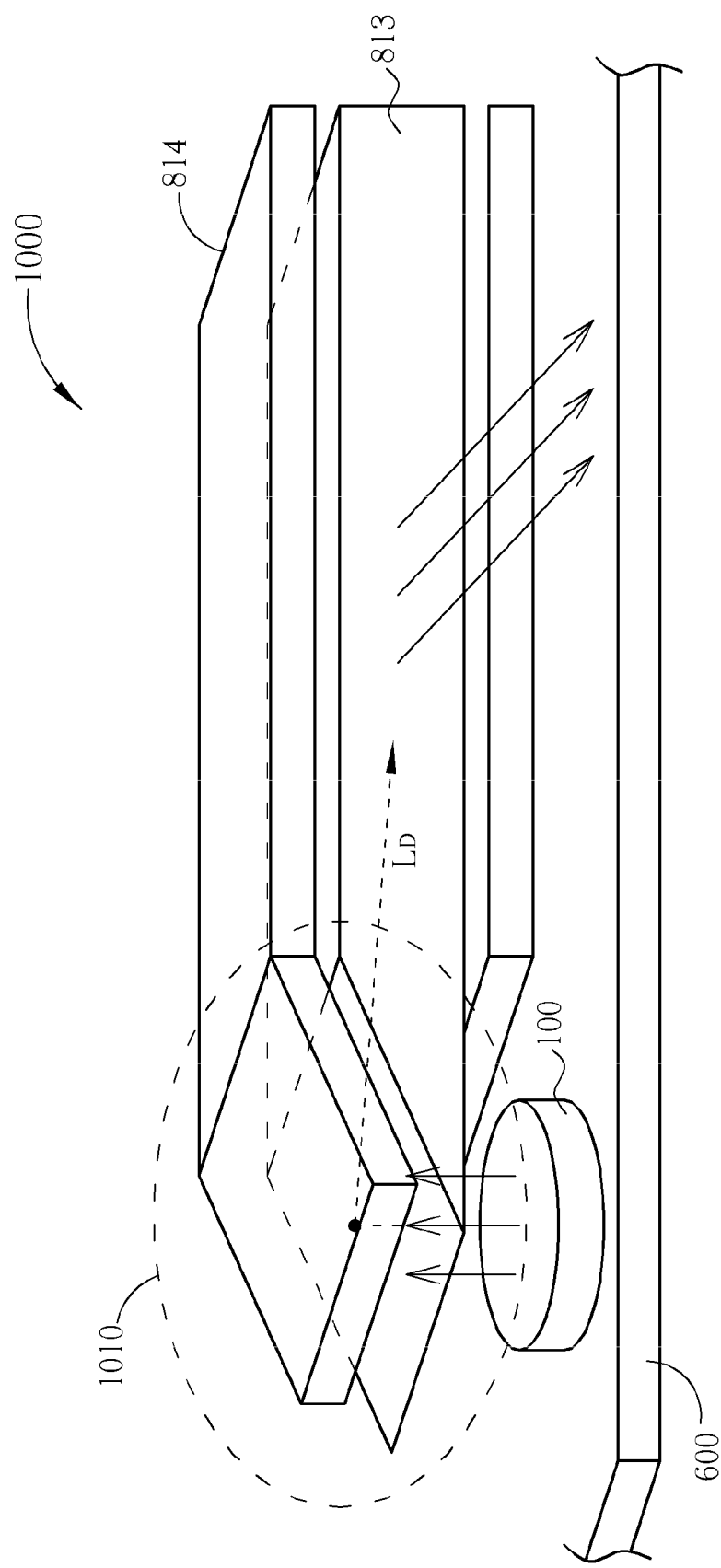
FIG. 15 is a diagram illustrating a structure of light guide component according to another embodiment of the present invention.

Please refer to FIG. 15. FIG. 15 is a diagram illustrating a structure of light guide component 1000 according to another embodiment of the present invention. Compared with the light guide component 810 in FIG. 14, the light guide component 1000 further comprises a direction-changing structure 1010. The direction-changing structure 1010 is utilized for turning the light-receiving surface 811 to face the substrate 600, and turning the received light of the light-receiving surface 811 to be parallel to the substrate 600 so as to guide the light into the light guider 813. More particularly, in the light guide component 1000, the light-receiving surface 811 faces the substrate 600 by means of the direction-changing structure 1010. Thus, the lighting component 100 can be directly disposed on the substrate 600 and the direction of the lights provided by the lighting component 100 do not have to be additionally changed by a connector. For example, in FIG. 15, the reflecting component 814 and the light guider 813 are bended as a triangle structure for forming the direction-changing structure 1010. When a light $L_D$ provided by the lighting component 100 is emitted up to the direction-changing structure 1010, the light $L_D$ passes through the light guider 813 at first, and then the light $L_D$ is reflected by the reflecting component 814 in the direction-changing structure 1010 so that the light $L_D$ is turned right. In addition, since the light guide component is flat, the area of the surface 8131 (the light-receiving surface 811) of the light guider 813 in FIG. 14 is very small. In this way, the lights provided by the lighting component 100 can not be efficiently emitted into the surface 8131 (the light-receiving surface 811) of the light guider 813. However, in FIG. 15, the light-receiving surface 811 can face the substrate 600 by means of the direction-changing structure 1010. As a result, even the light guide component 1000 is flat, the area of the light-receiving surface 811 is not limited. In this way, the area of the light-receiving surface 811 can be designed to be large enough so that the light-receiving surface 811 can efficiently receive the lights provided by the lighting component 100.

Figure 16:
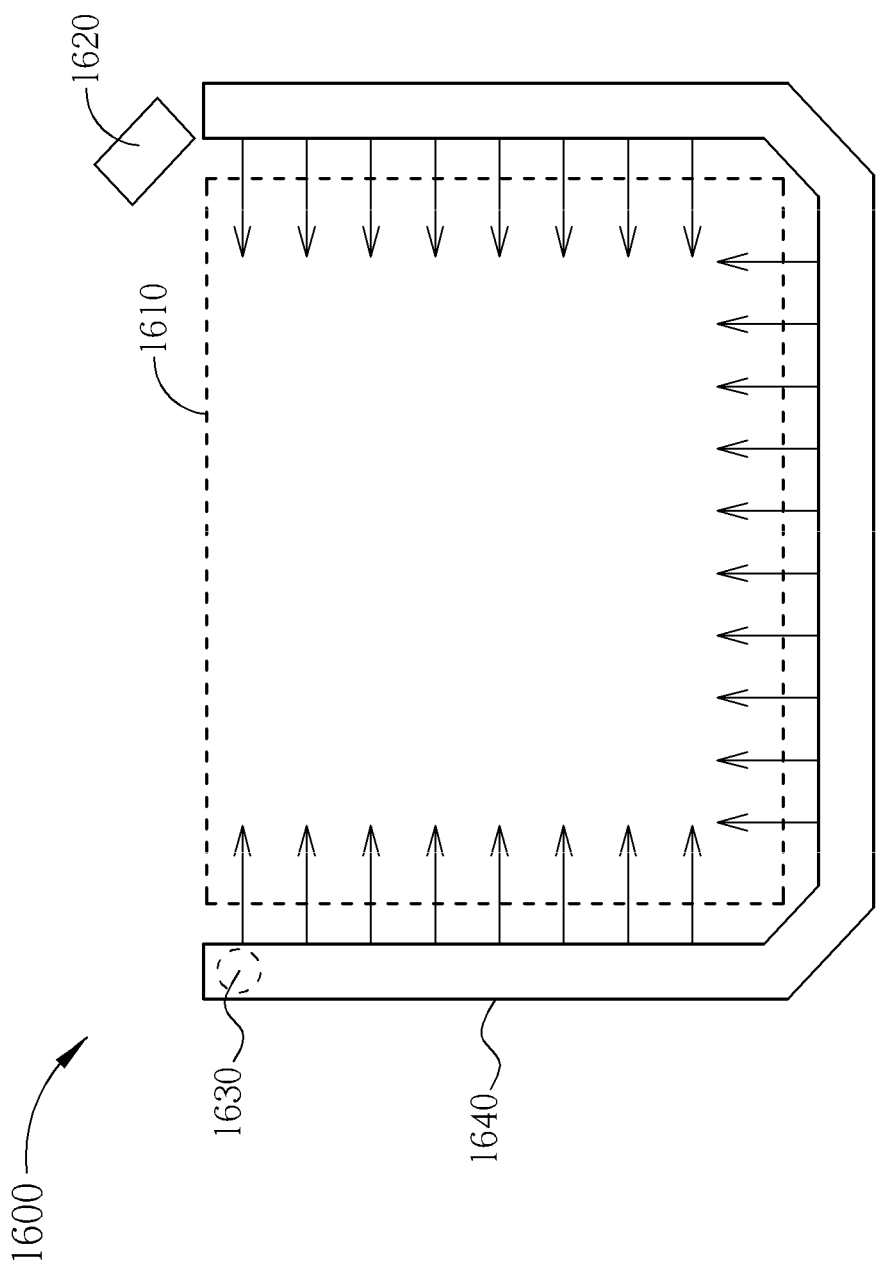
FIG. 16 is a top view of an optical touch module by means of a light guide module according to a preferred embodiment of the present invention.

Please refer to FIG. 16. FIG. 16 is a top view of an optical touch module 1600 by means of a light guide module according to a preferred embodiment of the present invention. The optical touch module 1600 comprises a touch area 1610, a sensor 1620, a lighting component 1630, and a light guide module 1640. The sensor 1620 is located at a first corner of the touch area 1610 (in FIG. 16, the sensor 1620 is at the top right corner for example). The lighting component 1630 is disposed on a first side of the touch area 1610 for providing lights (in FIG. 16, the lighting component 1630 is at the left side for example). The optical touch module 1640 is disposed on three sides of the touch area 1610 for evenly distributed the lights provided by the lighting component 1630 to the touch area 1610. The light-receiving surface of the light guide component of the light guide module 1640 can face the bottom substrate by means of the structure of the light guide module mentioned in FIGS. 6~15. Therefore, the lighting component 1630 can be directly disposed at the location corresponding to the light-receiving surface of the light guide component of the light guide module on the substrate. In this way, the lights provided by the lighting component 1630 are convergently distributed in the touch area 1610 by means of the light guide component and the focusing component of the light guide module, so that the signal-to-noise ratio of the received signal of the sensor 1620 increases. Hence, the optical touch module determines the touch location of the finger or the contacting object more correctly. In addition, in FIG. 16, the optical touch module 1600 comprises only one lighting component 1630 for example. The light guide module 1640 can guide the lights provided by the lighting component 1630 from the three sides of the touch area 1610 into the touch area 1610 by means of the designation of the reflecting surface 815 of the light guide component 810. However, when the number and the positions of the lighting components of the optical touch module 1600 change, the number and the positions of the light guide modules of the optical touch module 1600 can be designed according to the above-mentioned illustration. For instance, the optical touch module 1600 can be realized in a way similar to FIG. 1. That is, two light guide modules are respectively disposed on two sides of the touch area. The two light guide modules receive the lights provided by the same light component and guide the lights from the two sides into the touch area; the optical touch module 1600 can be realized in a way similar to FIG. 2 as well. That is, three light guide modules are respectively disposed on three sides of the touch area. The three light guide modules receive the lights provided by two light components and guide the lights from the three sides into the touch area; the optical touch module 1600 also can be realized in a way similar to FIG. 3. That is, a first light guide module is disposed on a first side (the left side) of the touch area. A second light guide module is disposed on a second side (the bottom side) and a third side (the right side) of the touch area by means of the reflecting surface. The first and the second light guide modules receive the lights provided by the same components and guide the lights from the first, the second and the third sides into the touch area.

In conclusion, the present invention provides a light guide module. The light guide module of the present invention can be applied in an optical touch module. The light guide module of the present invention can convergently distribute the lights in the touch area of the optical touch module by means of the focusing component focusing the lights emitted from the light guide component. In this way, the lights provided by the lighting component are efficiently used so that the signal-to-noise ratio of the received signal of the sensor of the optical touch module increases. Consequently, the optical touch module determines the touch location of the finger or the contacting object more correctly. In addition, in the light guide module of the present invention, the light-receiving surface can face the substrate by means of the direction-changing structure. Hence, the area of the light-receiving surface is not limited, so that the light-receiving surface can efficiently receive the lights provided by the lighting component and the lighting component can be directly disposed on the substrate, providing a great convenience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A light guide module, applied in an optical touch module, the optical touch module having a touch area, a sensor, and a lighting component, the sensor located on a first corner of the touch area, the lighting component utilized for providing a light, the light guide module and the lighting component disposed on a first side of the touch area for evenly distributing the light provided by the lighting component to the touch area, the light guide module comprising:
  a light guide component, for guiding the light to diffuse along the light guide component, comprising:
    a light-receiving surface, facing the lighting component for receiving the light; and
    a light-emitting surface, facing the touch area;
  a focusing component, for focusing the light emitted from the light-emitting surface so as to urge the light evenly distributed in the touch area; and
  a holder, coupled to the focusing component for covering and fixing the light guide component;
  wherein the holder and the focusing component are integrated together.

2. The light guide module of claim 1, wherein the focusing component is a convex-concave lens, a convex-flat lens, a convex-convex lens, or a flat-concave lens.

3. The light guide module of claim 2, wherein when the focusing component is a convex-concave lens, a convex surface of the convex-concave lens faces the light-emitting face, and a concave surface of the convex-concave lens faces the touch area; when the focusing component is a convex-flat lens, a convex surface of the convex-flat lens faces the light-emitting face, and a flat surface of the convex-flat lens faces the touch area; when the focusing component is a flat-concave lens, a flat surface of the flat-concave lens faces the light-emitting face, and a concave surface of the flat-concave lens faces the touch area.

4. An optical touch module, comprising:
  a touch area;
  a sensor, located at a first corner of the touch area;
  a lighting component, disposed on a first side of the touch area for providing a light; and
  a light guide module, disposed on the first side of the touch area for evenly distributing the light provided by the lighting component to the touch area, the light guide module comprising:
    a light guide component, for guiding the light to diffuse along the light guide component, comprising:
      a light-receiving surface, facing the lighting component for receiving the light; and
      a light-emitting surface, facing the touch area;
    a focusing component, for focusing the light emitted from the light-emitting surface so as to urge the light evenly distributed in the touch area; and
    a holder, coupled to the focusing component for covering and fixing the light guide component
  wherein the holder and the focusing component are integrated together.

5. The optical touch module of claim 4, wherein the focusing component is a convex-concave lens, a convex-flat lens, a convex-convex lens, or a flat-concave lens.

6. The optical touch module of claim 5, wherein when the focusing component is a convex-concave lens, a convex surface of the convex-concave lens faces the light-emitting face, and a concave surface of the convex-concave lens faces the touch area; when the focusing component is a convex-flat lens, a convex surface of the convex-flat lens faces the light-emitting face, and a flat surface of the convex-flat lens faces the touch area; when the focusing component is a flat-concave lens, a flat surface of the flat-concave lens faces the light-emitting face, and a concave surface of the flat-concave lens faces the touch area.

7. A method of increasing a signal-to-noise ratio of an optical touch module, the optical touch module having a touch area, a sensor, a lighting component, and a light guide component, the sensor located at a first corner of the touch area, the lighting component utilized for providing a light, the light guide component utilized for guiding the light to diffuse along the light guide component, the light guide component comprising a light-receiving surface and a light-emitting surface, the light-receiving surface facing the lighting component for receiving the light, the light-emitting surface facing the touch area, the method comprising:

disposing a focusing component in front of the light-emitting surface of the light guide component; and the focusing component focusing the light emitted from the light-emitting surface so as to urge the light convergently distributed in the touch area, increasing the signal-to-noise ratio of the optical touch module;

wherein the focusing component is integrated with a holder covering and fixing the light guide component.

8. The method of claim 7, wherein the lighting component is an infrared Light-Emitting Diode (LED), and the focusing component is transparent to infrared light.

9. The method of claim 7, wherein the focusing component is a convex-concave lens, a convex-flat lens, a convex-convex lens, or a flat-concave lens.

10. The method of claim 9, wherein disposing the focusing component in front of the light-emitting surface of the light guide component comprises:

when the focusing component is a convex-concave lens, disposing a convex surface of the convex-concave lens to face the light-emitting face, and disposing a concave surface of the convex-concave lens to face the touch area.

11. The method of claim 9, wherein disposing the focusing component in front of the light-emitting surface of the light guide component comprises:

when the focusing component is a convex-flat lens, disposing a convex surface of the convex-flat lens to face the light-emitting face, and disposing a flat surface of the convex-flat lens to face the touch area.

12. The method of claim 9, wherein disposing the focusing component in front of the light-emitting surface of the light guide component comprises:

when the focusing component is a flat-concave lens, disposing a flat surface of the flat-concave lens faces the light-emitting face, and disposing a concave surface of the flat-concave lens faces the touch area.

* * * * *